C. ELKIN.
HOSE ATTACHING DEVICE.
APPLICATION FILED FEB. 8, 1913.
1,091,819.
Patented Mar. 31, 1914.
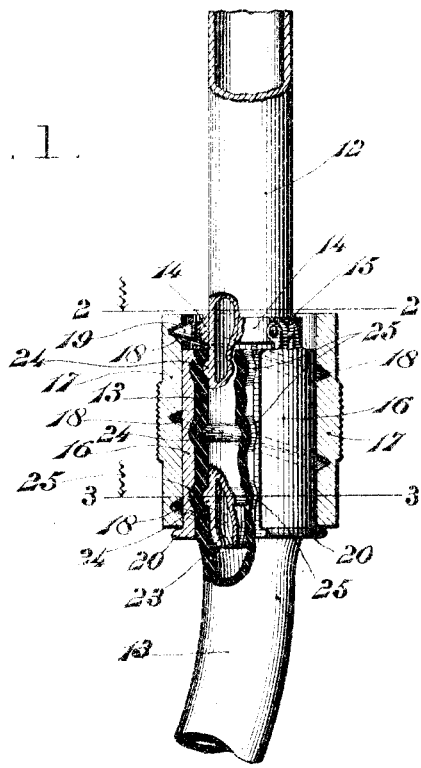
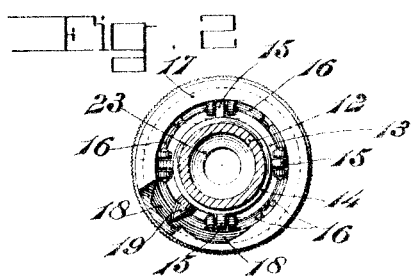
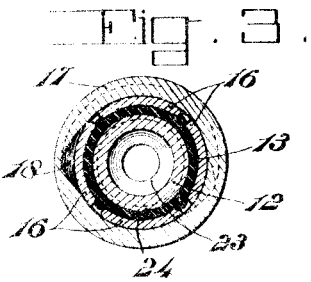
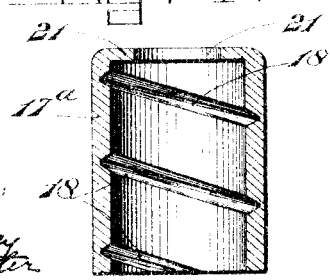
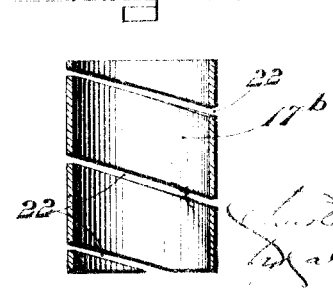
WITNESSES:
C. W. Sweeney
S. H. Carpenter
INVENTOR:
Charles Elkin
Attorneys.

United States patent office.

CHARLES ELKIN, OF NEW YORK, N. Y.

HOSE-ATTACHING DEVICE.

1,091,819.

Specification of Letters Patent.   Patented Mar. 31, 1914.

Application filed February 8, 1913.   Serial No. 747,103.

*To all whom it may concern:*

Be it known that I, CHARLES ELKIN, a citizen of the United States, residing at New York, in the county of New York and State of New York, have invented or discovered certain new and useful Improvements in Hose-Attaching Devices, of which the following is a specification, reference being had therein to the accompanying drawings.

In attaching a rubber hose to a faucet or similar water delivery spout, as is done in bath tubs and barber shops where a hose of this kind is frequently employed in connection with sprinklers or spray devices, for shampooing or the like, considerable difficulty or annoyance has been experienced owing to the fact that the hose sometimes becomes detached from the faucet or water spout under a heavy pressure of water, and a spilling or squirting of the water about often results.

This invention has for its object to obviate this difficulty by providing a convenient device by which a rubber or other flexible hose may be securely attached or coupled to a faucet or water spout, or a gas delivery pipe or nozzle, in such a manner that it cannot become accidentally detached. This improved device includes a series of pivoted clamping arms between which and the exterior of the water delivery pipe or nozzle the hose is interposed, these clamping arms being acted on by an encircling rotatable ring which forces them against the hose, and which is provided with a spiral track into which a stationary pin projects, so that when said sleeve is turned it will be caused to travel endwise to engage or release said clamping arms.

In the accompanying drawing Figure 1 is a sectional elevation illustrating one form of the invention. Fig. 2 is a section on line 2—2, and Fig. 3 is a section on line 3—3, Fig. 1. Figs. 4 and 5 illustrate modified forms of clamping rings.

Referring to the drawing, 12 denotes a pipe or nozzle to which a rubber or other flexible hose 13 is to be attached, said pipe or nozzle, in the construction shown, having an attached sleeve 14 provided with four radially extending lugs or projections 15 to each of which is pivoted a depending quadrant clamping arm 16, these clamping arms being curved transversely to fit against the hose. Encircling the clamping arms 16 is a cylindrical rotatable clamping ring or sleeve 17 provided with a spiral groove or track 18 which is entered by a fixed pin 19, so that by turning the said clamping ring 17 in one direction or the other it will be caused to travel endwise, either for the purpose of forcing the clamping arms against the hose or for releasing said arms. The pin 19 is located between two of said lugs or projections, as shown in Fig. 2. To limit the downward travel of the ring 17, when the latter is in full clamping position, the arms 16 are provided at their free ends with slight radial projections or flanges 20 against which the lower end of the said ring will abut.

In the form of the invention shown in Fig. 4, a stop for the downward movement of the clamping ring 17ª is afforded by a flange 21 at the upper end of the said ring, so that the downward movement of said ring will be limited by the engagement of said flange with the radially extending lugs or projections 14, or with the pin 19. Instead of a solid clamping ring, in which the spiral groove or track is formed, the clamping ring may be made of thin metal, as illustrated in Fig. 5, in which the ring 17ᵇ is shown as having a spiral slot 22 extending from one end to the other thereof, and which slot provides a track to be entered by the pin 19. This form of clamping ring, being made of thin metal, as brass, which is somewhat resilient, provides an elastic clamping ring which yieldingly grips the clamping arms. In all of these forms of the invention the clamping and holding rings or sleeves are of a length approximately equal to the length of the clamping arms, so as to inclose and cover said arms when the parts are in clamping position, and thus the coupling presents a neat and attractive appearance.

The pipe or nozzle 12 is preferably provided with a tapered lower end 23 to facilitate placing the rubber hose in operative position, and the said pipe or nozzle is preferably provided exteriorly with a series of encircling ribs or beads 24, forming a corrugated construction, and the interior faces of the clamping arms 15 are preferably provided with grooves 25 registering with said ribs or beads. By virtue of this construction the flexible hose will be strongly gripped and more securely retained in place than it otherwise would be; and although the rib and groove construction of the nozzle and gripping arms is preferred the invention is not to be understood as being limited thereto, as sufficient gripping pressure might be secured without it.

From the foregoing it will be understood that the invention provides inexpensive and convenient means for holding a flexible hose in place on a pipe or delivery nozzle, while the construction is such, owing to the somewhat steep pitch of the spiral track or groove of the clamping ring, that the latter may be quickly moved to clamping or unclamping position simply by two or three turns thereof. The invention will be particularly useful in securely coupling a flexible hose to a gas delivery pipe or nozzle where an accidental uncoupling might result seriously from the escape of gas.

Having thus described my invention I claim and desire to secure by Letters Patent:

1. The combination with a pipe or delivery nozzle provided with a fixed pin, of a series of pivoted clamping arms disposed exteriorly to said pipe or nozzle, and a ring adapted to encircle said arms and having a spiral track entered by said pin, so that by turning said ring the latter will be caused to travel endwise into clamping or unclamping position.

2. The combination with a pipe or delivery nozzle provided with a fixed pin, of a series of pivoted clamping arms disposed exteriorly to said pipe or nozzle, a ring adapted to encircle said arms and having a spiral track entered by said pin, so that by turning said ring the latter will be caused to travel endwise into clamping or unclamping position, and means for limiting the traveling movement of said ring.

3. The combination with a pipe or delivery nozzle provided with a fixed pin and with radial lugs or projections, of a series of clamping arms pivoted to said lugs or projections and disposed exteriorly to said pipe or nozzle, and a ring of a length approximately equal to the length of said clamping arms and being thus adapted to encircle and inclose or cover the same, said ring having a spiral track entered by said pin.

4. The combination with a pipe or delivery nozzle provided with a fixed pin and with radial lugs or projections between two of which said pin is located, of a series of clamping arms pivoted to said lugs or projections and disposed exteriorly to said pipe or nozzle, and a cylindrical ring or sleeve adapted to inclose said arms and said lugs or projections and having a spiral track entered by said pin.

5. The combination with a pipe or delivery nozzle provided with a fixed pin and with radial lugs or projections between two of which said pin is located, of a series of clamping arms pivoted to said lugs or projections and disposed exteriorly to said pipe or nozzle, and a cylindrical ring or sleeve adapted to inclose said arms and said lugs or projections and having a spiral track entered by said pin, a portion of said pipe or nozzle having exterior encircling ribs or beads, and the interior faces of said clamping arms having grooves registering with said ribs or beads.

In testimony whereof I affix my signature, in presence of two witnesses.

CHARLES ELKIN.

Witnesses:
 THERESA HYNES,
 WINIFRED BAKER.